US006183390B1

United States Patent
Koga et al.

(12) United States Patent
(10) Patent No.: US 6,183,390 B1
(45) Date of Patent: Feb. 6, 2001

(54) SPEED RATIO CONTROLLER AND CONTROL METHOD OF TOROIDAL CONTINUOUSLY VARIABLE TRANSMISSION

(75) Inventors: Masato Koga, Atsugi; Satoshi Takizawa; Yasushi Narita, both of Yokohama; Yuusuke Minagawa, Yokosuka; Mitsuru Watanabe, Hadano, all of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/352,758

(22) Filed: Jul. 14, 1999

(30) Foreign Application Priority Data

Jul. 27, 1998 (JP) .................................................. 10-211042

(51) Int. Cl.$^7$ .................................................. F16H 61/00

(52) U.S. Cl. .................................. 477/37; 477/46; 701/54

(58) Field of Search .......................... 477/37, 46; 701/51, 701/54; 476/10

(56) References Cited

U.S. PATENT DOCUMENTS 5,997,430 * 6/2000 Tanabe ..................................... 477/46
6,076,031 * 6/2000 Takizawa et al. ................. 477/37 X

FOREIGN PATENT DOCUMENTS 9-196156    7/1997  (JP) .

* cited by examiner

Primary Examiner—Khoi Q. Ta
(74) Attorney, Agent, or Firm—Foley & Lardner

(57) ABSTRACT

In a toroidal continuously variable transmission for a vehicle, either of an automatic operation mode and a manual operation mode is selected by a driver via a selector lever (59). A speed ratio grade in the manual operation mode is also designated via the selector lever (59) by the driver. A controller (61) is programmed to control a speed ratio of the transmission to a target speed ratio corresponding to the designated speed ratio grade. The controller (61) is further programmed to prevent the speed ratio from varying after an input torque to the transmission has changed. This control may be realized by setting different target speed ratios for an identical speed ratio grade according to the input torque of the transmission.

13 Claims, 7 Drawing Sheets

SPEED RATIO

ENGINE TORQUE

TVO
FIG. 9A
PRIOR ART 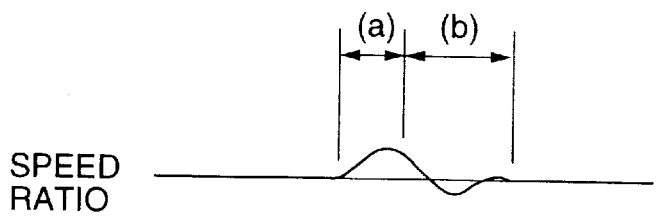
SPEED RATIO
FIG. 9B
PRIOR ART
ENGINE TORQUE
FIG. 9C
PRIOR ART  
TVO

SPEED RATIO CONTROLLER AND CONTROL METHOD OF TOROIDAL CONTINUOUSLY VARIABLE TRANSMISSION

FIELD OF THE INVENTION

This invention relates to speed ratio control of a vehicle continuously variable transmission which is provided with a manual operation mode.

BACKGROUND OF THE INVENTION

A continuously variable transmission for a vehicle which is operated in a manual operation mode as well as in an automatic operation mode is disclosed in Tokkai Hei 9-196156 published in 1997 by the Japanese Patent Office.

The transmission is provided with a speed ratio controller so as to control the speed ratio of the transmission. The speed ratio controller stores a map defining plural fixed target speed ratios corresponding to various speed ratio grade any of which may be selected by a driver via a selector lever.

When in the manual operation mode, the controller looks up this map for finding the target speed ratio corresponding to the selected speed ratio grade and feedback controls the speed ratio of the transmission such that it coincides with the target speed ratio found in the map. With this controller, therefore, the continuously variable transmission may act as a quasi-manual transmission.

SUMMARY OF THE INVENTION

The toroidal continuously transmission is provided with power rollers which vary their gyration angle according to an oil pressure supplied from an oil pressure control valve. The speed ratio of the transmission varies according to the variation of the gyration angle of the power rollers. The variation of the speed ratio is fed back to the oil pressure control valve via a feedback mechanism connected to a trunnion which supports one of the power rollers.

When an output torque of an engine of the vehicle changes, the torque input to the transmission changes accordingly. Due to the change of the input torque, the equilibrium of forces acting on the power roller is affected and the trunnion supporting the power roller suffers deformation.

This deformation of the trunnion introduces an error in the speed ratio fed back via the feedback mechanism to the oil pressure control valve. This error is known as a torque shift error in the toroidal continuously transmission.

Oil pressure in the oil pressure control valve is feedback controlled by the controller so that the deviation of the real speed ratio of the transmission from the target speed ratio derived from the map becomes zero. When the deviation due to the above torque shift error is recognized, therefore, the oil pressure is immediately controlled so as to eliminate the deviation.

However, due to this control, the speed ratio may oscillate before it comes to coincide with the target speed ratio.

In the manual operation mode wherein the speed ratio should be fixed, the driver may experience some discomfort from the oscillation of speed ratio.

It is therefore an object of this invention to suppress oscillation of speed ratio of the toroidal continuously variable transmission in the manual operation mode.

In order to achieve the above object, this invention provides a speed ratio controller for use with a toroidal continuously variable transmission which transmits an input torque from an engine to a drive wheel of a vehicle at an arbitrary speed ratio.

The controller comprises a member for selecting either of an automatic operation mode and a manual operation mode of the transmission, a member for designating a speed ratio grade in the manual operation mode, a sensor for detecting the input torque of the transmission, a sensor for detecting a real speed ratio of the transmission, and a microprocessor programmed to calculate a target speed ratio according to the speed ratio grade designated by the speed ratio grade designating member, feedback control the speed ratio of the transmission such that the real speed ratio coincides with the target speed ratio, and prevent the speed ratio of the transmission from varying irrespective of the target speed ratio, after the input torque is varied.

This invention also provides a method for controlling a speed ratio of a toroidal continuously variable transmission. The toroidal continuously variable transmission transmits an input torque from an engine to a drive wheel of a vehicle at an arbitrary speed ratio, and comprises a member for selecting either of an automatic operation mode and a manual operation mode of the transmission and a member for designating a speed ratio grade in the manual operation mode.

The method comprises detecting the input torque of the transmission, detecting a real speed ratio of the transmission, calculating a target speed ratio according to the speed ratio grade designated by the speed ratio grade designating member, feedback controlling the speed ratio of the transmission such that the real speed ratio coincides with the target speed ratio, and preventing the speed ratio of the transmission from varying irrespective of the target speed ratio, after the input torque is varied.

The details as well as other features and advantages of this invention are set forth in the remainder of the specification and are shown in the accompanying drawings.

BRIEF DESCRIPTION OF THE DRAWINGS

FIGS. 9A–9C are timing charts describing the variation of the speed ratio, an engine output torque and a throttle opening under the speed ratio control by a prior art control device.

DESCRIPTION OF THE PREFERRED EMBODIMENTS

Figure 1:
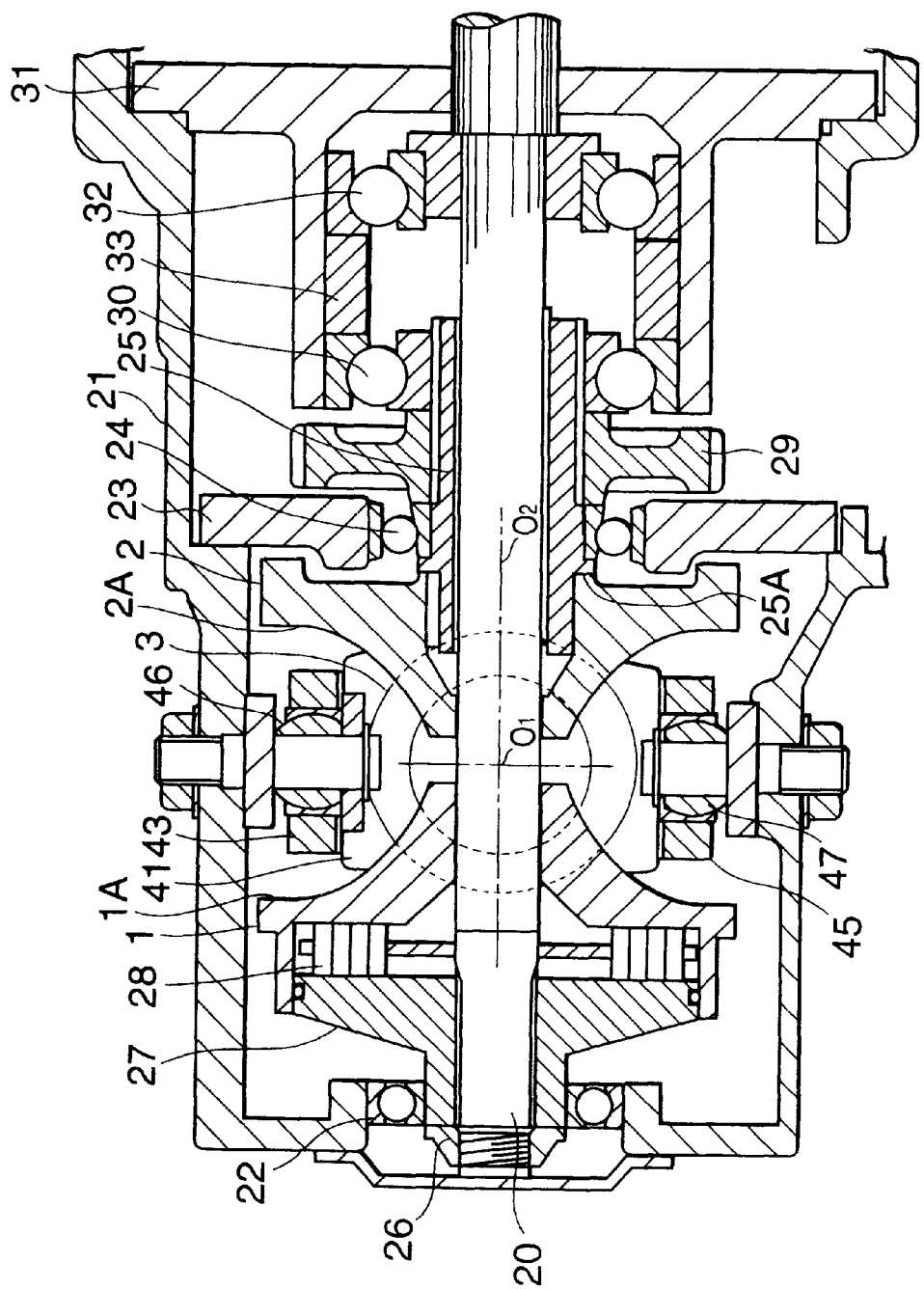
FIG. 1 is a longitudinal sectional view of a toroidal continuously variable transmission to which this invention is applied.

Referring to FIG. 1 of the drawings, a toroidal continuously variable transmission to which this invention is applied comprises an input shaft 20 and an output gear 29.

The input shaft 20 is connected to an engine of a vehicle via a torque converter. The engine and the torque converter are located on the right side of FIG. 1, but not shown. The output gear 29 outputs a rotation torque for driving the vehicle.

A cam flange 27 screws into the tip of the input shaft 20. A nut 26 is tightened to the tip of the input shaft 20 so that the cam flange 27 is fixed to the input shaft 20.

The cam flange 27 is inserted in a cylindrically shaped back side part of an input disk 1. The input shaft 20 passes through the center of the input disk 1 leaving a small clearance. By this arrangement, the input disk 1 is maintained coaxial with the rotation shaft 20. The cam flange 27 is supported in a case 21 via a bearing 22, and the base end of the input shaft 20 is supported by an angular bearing 32.

A cam roller 28 is disposed between the cam flange 27 and the input disk 1. The cam roller 28 comprises a cam surface which presses the input disk 1 to the right of the figure according to the relative rotational displacement of the cam flange 27 and the input disk 1.

An output disk 2 is attached free to rotate relative to the input disk 1 on the outer circumference of the rotation shaft 20.

The input disk 1 and power output disk 2 comprise toroidal curved surfaces 1A, 1B which face each other, and a pair of power rollers 3 is gripped between these curved surfaces 1A, 1B.

The output disk 2 is spline jointed to a sleeve 25 supported on the outer circumference of the rotation shaft 20 via a needle bearing. A large diameter part 25A is formed in the sleeve 25 to support a thrust load which interacts on the power output disk 2 towards the right of FIG. 1.

The sleeve 25 is supported by an intermediate wall 23 of the case 21 via a radial bearing 24, and is also supported by an angular bearing 30. The angular bearing 30 and an angular bearing 32 are engaged inside a cylindricallyshaped cover 31 fixed to the case 21.

A spacer 33 which engages with the inside of the cover 31 is also gripped by the angular bearings 30, 32.

The thrust force exerted by the input disk 1 on the rotation shaft 3 towards the left of the drawing, and the thrust force exerted by the output disk 2 on the sleeve 25, therefore cancel each other out due to the spacers 33 gripped between the angular bearings 30, 32. Also, the load which acts on the angular bearings 30, 32 in the radial direction is supported by the cover 31.

The output gear 29 is spline jointed to the outer circumference of the sleeve 25. The rotation of the output gear 29 is transferred to the outside of the case 21 via a gear unit, not shown.

The power rollers 3 are supported by trunnions 41.

By driving the trunnions 41 in a direction perpendicular to the rotation shaft 20, the contact positions of the power rollers 3 with the input disk 1 and output disk 2 are changed. Due to this change of contact positions, a force is exerted on the power rollers 3 by the disks 1 and 2 so as to rotate the power rollers 3 around the axis $O_3$ which causes the gyration angle of the power rollers 3 to vary. As a result, the distance of the contact point between the power rollers 3 and the input disk 1 from the rotation shaft 20, and the distance of the contact point between the power rollers 3 and the output disk 2 from the rotation shaft 20, vary, and a speed ratio varies accordingly.

Figure 2:
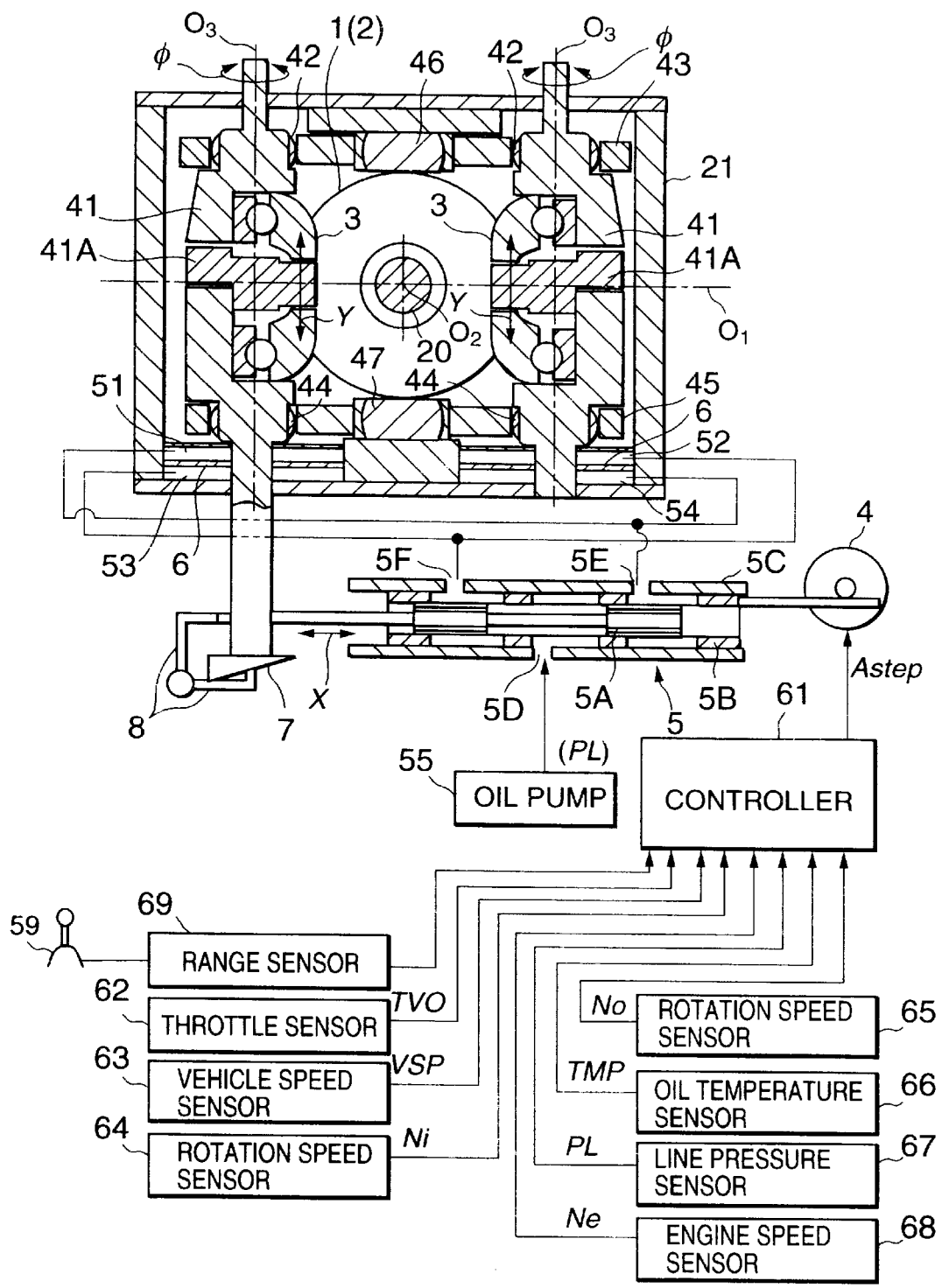
FIG. 2 is a schematic diagram of a speed ratio control device according to this invention.

As shown in FIG. 2, the trunnions 41 support the power rollers 3 such that they are free to rotate about an axis $O_1$ shown in FIG. 2 via a crank-shaped shaft 41A, and such that they are free to swing within a small range around the base end of the shaft 41A.

The upper end of each trunnion 41 is joined to an upper link 43 via a spherical joint 42, and a lower end is joined with a lower link 45 via a spherical joint 44. The upper link 43 and lower link 45 are supported in the case 21 via spherical joints 46 and 47, respectively. Due to these links, the pair of trunnions 41 always displaces in reverse directions and by an equal distance along an axis $O_3$ shown in FIG. 2.

A piston 6 is fixed to each of these trunnions 41. The piston 6 displaces the trunnion 41 along the axis $O_3$ according to an oil pressure balance of oil chambers 51, 53 and oil chambers 52, 54 which are formed in the case 21. Oil pressure is supplied to these oil chambers 51, 52, 53, and 54 from an oil pressure control valve 5.

The oil pressure control valve 5 comprises an outer sleeve 5C, inner sleeve 5B and a spool 5A which slides on the inside of the inner sleeve 5B. A port 5D which draws the pressure of an oil pump 55, port 5E connected to the oil chambers 51, 54, and port 5F connected to the oil chambers 52, 53 are formed in the outer sleeve 5C, respectively. The inner sleeve 5B is connected with a step motor 4 via a rack and pinion. Also, openings at the ends of the inner sleeve 5B are connected to drain passages, not shown.

The spool 5A is joined to a link 8. The link 8 displaces the spool 5A according to a rotational displacement around the axis $O_3$ and a displacement along the axis $O_3$ of a precess cam 7 fixed to the lower end of one of the trunnions 41, and mechanically feeds back the gyration angle of the power roller 3 to the oil pressure control valve 5.

The oil pressure control valve 5 changes the pressure supplied to the ports 5E, 5F according to a command signal Astep input to the step motor 4 from the controller 61.

For example, when the spool 5A, outer sleeve 5B and inner sleeve 5C are in the positions shown in FIG. 2, the oil chambers 52, 53 receive high pressure oil of an pressure pump 55 from the port 5F, and oil in the oil chambers 51, 54 is drained via the port 5E.

As a result, the trunnion 41 on the left of the figure moves upwards along the axis $O_3$, and the trunnion 41 on the right of the figure moves downwards along the axis $O_3$. Hence, the rotation axis $O_1$ of the power roller 3 displaces from a neutral position at which it intersects a rotation axis $O_2$ of the input disk 1 and the output disk 2, i.e., the center of the rotation shaft 20, in the direction shown by the arrow Y in the drawing.

Due to this displacement, the input disk 1 and output disk 2 cause the power roller 3 together with the trunnions 41 to perform a rotational displacement around the axis $O_3$ and thereby continuously vary the speed ratio.

At this time, the precess cam 7 fixed to the lower end of one trunnion 41 feeds back the displacement amount in the direction of the axis $O_3$ of the trunnion 41 and the rotational displacement of the power roller 3 around the axis $O_3$, to the oil pressure control valve 5 via a link 8, and the spool 5A is displaced in the direction shown by the arrow X in the drawing.

When a speed ratio corresponding to the above-mentioned command signal Astep is attained by this feedback operation, the positional relationship of the spool 5A and inner sleeve 5B is restored to the neutral position wherein inflow and outflow of oil to and from all the oil chambers is stopped.

Hence, the trunnions 41 are maintained in a state where they are displaced in the direction of the axis $O_3$.

On the other hand, the power roller 3 which performed a rotational displacement around the $O_3$ axis pivots on the base end of the shaft 41 A while maintaining the new gyration angle, and returns to the neutral position at which the axis $O_1$ and the axis $O_2$ intersect.

The reason why the precess cam 7 feeds back not only the rotational displacement around the axis $O_3$ of the power roller 3, i.e., the gyration angle, but also the axial displacement of the trunnion 41, is that the feedback of the axial displacement of the trunnion 41 works as a damping element which prevents the speed ratio control from oscillating. The command signal Astep is determined by the controller 61.

The controller 61 comprises a microprocessor comprising a central processing unit (CPU), random access memory (RAM), read-only memory (ROM) and input/output interface (I/O interface).

Signals are input to the controller 61 from a throttle sensor 62 which detects a throttle opening TVO of the engine, vehicle speed sensor 63 which detects a vehicle speed VSP, rotation speed sensor 64 which detects a rotational speed Ni of the input disk 1, rotation speed sensor 65 which detects a rotational speed No of the output disk 2, oil temperature sensor 66 which detects a temperature TMP of the above-mentioned oil pressure fluid, line pressure sensor 67 which detects a line pressure PL, i.e., the oil pressure which the port 5D supplies from the oil pressure pump 55, engine speed sensor 68 which detects a rotation speed Ne of the engine, and a range sensor 69 which detects an operating mode of the transmission selected via a selector lever 59 and a speed ratio grade selected also via the selector lever 59 when the operating mode is a manual operation mode.

The selector lever 59 is a control member attached to the continuously variable transmission to allow the driver to choose the operating mode of the continuously variable transmission, one range being chosen from plural candidates including a forward travel automatic operation range, forward travel manual operation range, reverse range, neutral range, and parking range. Herein the forward travel automatic operation range corresponds to an automatic operation mode and the forward travel manual operation range corresponds to the manual operation mode. The selector lever 59 further allows the driver when in the forward travel manual operation range to designate a speed ratio grades from among six candidates, The controller 61 outputs the command signal Astep computed as described below, to the step motor 4 based on the above-mentioned signals.

Figure 3:
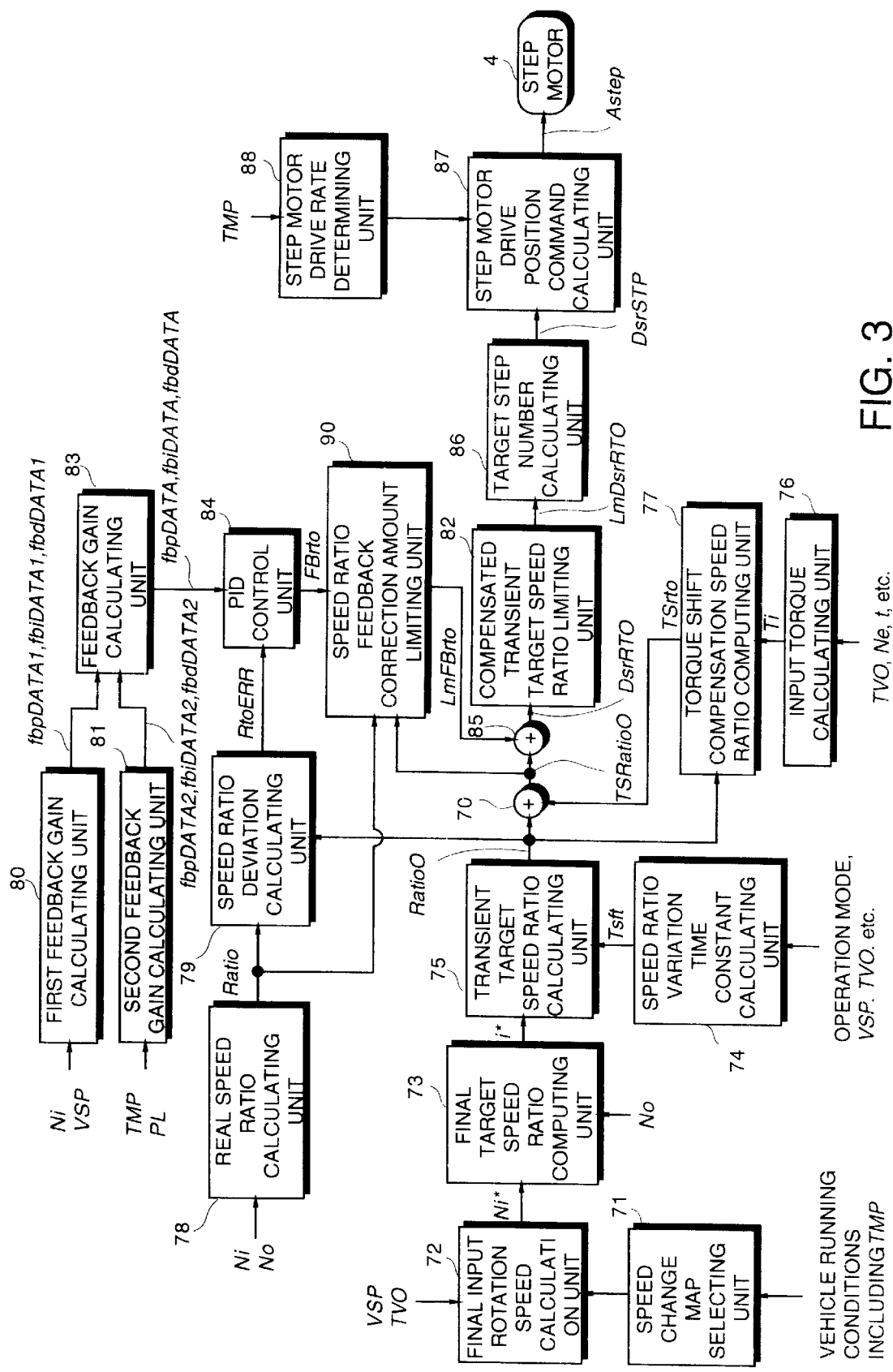
FIG. 3 is a block diagram for describing the structure of a controller according to this invention.

For this purpose, the controller 61 comprises processing units shown in FIG. 3. These units are virtual units constructed from the functions of the above-mentioned CPU, read-only memory and random access memory.

Figure 4:
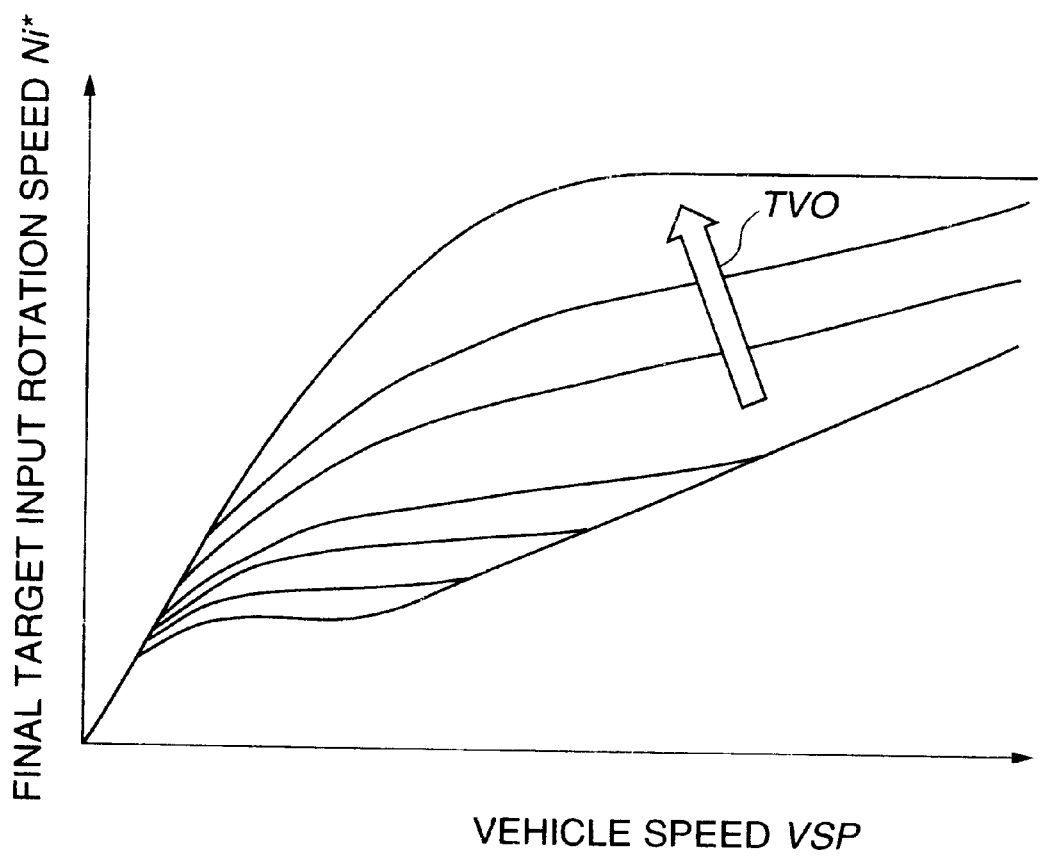
FIG. 4 is a diagram describing the contents of a speed change map in an automatic operation mode stored by the controller.

A speed change map selecting unit 71 selects one of speed change maps stored in the controller 61 according to the temperature TMP of the oil in the transmission, a selected operation mode of the transmission and other running conditions of the vehicle, The speed change map for the automatic operation mode defines a final target input rotation speed Ni* of the continuously variable transmission according to the throttle opening TVO and the vehicle speed VSP as shown in FIG. 4. Herein, the final target input rotation speed denotes a target value of the input rotation speed of the transmission under the steady running state A final input rotation speed calculation unit 72 calculates the final target input rotation speed Ni* of the transmission based on the speed change map selected by the speed change map selecting unit 71.

A final target speed ratio computing unit 73 divides the final input rotation speed Ni* by a rotation speed No of the output disk 2 detected by the rotation speed sensor 65, and calculates a final target speed ratio i*.

A speed ratio variation time constant calculating unit 74 determines a time constant Tsft of a speed ratio variation based on the operating mode of the transmission detected by the range sensor 69, vehicle speed VSP, throttle opening TVO, and deviation between a real speed ratio and a transient target speed ratio which will be described later.

The time constant Tsft is a constant specifying the rate of speed ratio variation until the final target speed ratio i* is attained, but as the time constant Tsft is varied dynamically in this embodiment as mentioned above, it is actually treated as a variable. The transient target speed ratio calculating unit 75 calculates a transient target speed ratio RatioO as a target value for every control cycle from the final target speed ratio i* and time constant Tsft.

The input torque calculating unit 76 calculates an engine output torque from the throttle opening TVO and engine speed Ne, and calculates a torque ratio t of the torque converter from the speed ratio of the input rotation speed and output rotation speed of the torque converter. The engine output torque is then multiplied by the torque ratio so as to calculate a transmission input torque Ti.

A torque shift error correction unit 77 calculates a torque shift error correction value TSrto for compensating a torque shift error which is peculiar to a toroidal continuously variable transmission. The correction value TSrto is calculated form the aforesaid transient target speed ratio RatioO and the transmission input torque Ti.

This torque shift error will now be described.

When the toroidal continuously variable transmission is operating, the input disk 1 and output disk 2 grip the power rollers 3. This grip pressure acts as force tending to keep the power rollers 3 away from the axis $O_1$, and it deforms the trunnions 41 which support the power rollers 3. The deformation of the trunnions 41 varies according to an input torque Ti of the transmission, and introduces an error into the feedback operation of the precess cam 7. As a result, a discrepancy appears between the command signal Astep input into the step motor 4 and the actual speed ratio realized by the command signal. Specifically, when the input torque increases, the actual speed ratio becomes larger than the target speed ratio, and when the input torque decreases, the actual speed ratio becomes smaller than the target speed ratio. The error due to this phenomenon is known as the torque shift error of the speed ratio.

According to a research by the inventors, it has become clear that the torque shift error reaches a maximum when the input torque Ti is still small. When the input toque Ti of the transmission is represented by the throttle opening TVO of the engine connected to the transmission, the torque shift error is significant when the throttle opening increases from 0 to ⅛. When the throttle opening is larger, the magnitude of the torque shift error does not change. The torque shift error is also significant when the throttle opening decreases from ⅛ to 0. It has also been confirmed by the inventors that the larger the magnitude of the torque shift error, the larger the actual speed ratio.

The magnitude of the torque shift error therefore varies according to the transient target speed ratio RatioO and transmission input torque Ti. The torque shift compensation speed ratio computing unit 77 calculates the torque shift error correction value TSrto from the transient target speed ratio RatioO and transmission input torque Ti by looking up a map stored beforehand in the controller 61. The torque shift error correction value TSrto is input into an adder 85 together with the transient target speed ratio RatioO and a speed ratio feedback correction amount FBrto which is output from a PID control unit 84.

Next, the speed ratio feedback correction amount FBrto will be described.

To make the real speed ratio follow a target value TSRatioO, the speed ratio feedback control performed by the controller 61 adds a correction to the signal output to the step motor 4. The correction is performed by software. The feedback control performed by the above-mentioned precess cam 7 is control performed with hardware so that the speed ratio of the continuously variable transmission coincides with the command signal Astep, and is therefore different from the feedback control performed by the controller 61.

In order to perform this feedback correction, a real speed ratio calculating unit 78 computes the real speed ratio Ratio of the transmission by dividing the input rotation speed of the transmission, i.e., the rotation speed Ni of the input disk 1, by the output rotation speed, i.e., the rotation speed No of the output disk 2. A speed ratio deviation calculating unit 79 subtracts the real speed ratio Ratio from the transient target speed ratio RatioO to calculate the speed ratio deviation RtoERR.

Based on the speed ratio deviation RtoERR, a first feedback gain calculating unit 80 sets a first feedback gain for feedback controlling the speed ratio on the basis of a proportional integral differential (PID) control known in the art.

The parameters set here are a first proportional control feedback gain fbpDATA1, first integral control feedback gain fbiDATA1 and first differential control feedback gain fbdDATA1 which are set based on the transmission input rotation speed Ni and the vehicle speed VSP, respectively.

To set these first feedback gains, a two-dimensional map of each first feedback gain with the transmission input rotation speed Ni and vehicle speed VSP as parameters is stored beforehand in the controller 61, and the first feedback gain computing unit 80 calculates these first feedback gains by looking up each map based on the transmission input rotation speed Ni and the vehicle speed VSP.

The second feedback gain calculating unit 81 sets a second feedback gain based on the transmission oil temperature TMP and the line pressure PL. The parameters set here are a second proportional control feedback gain fbpDATA2, second integral control feedback gain fbiDATA2 and second differential control feedback gain fbdDATA2. These second feedback gains are also found by looking up maps stored beforehand in the controller 61.

A feedback gain calculating unit 83 then calculates the proportional control feedback gain fbpDATA, the integral control feedback gain fbiDATA and the differential control feedback gain fbdDATA by multiplying the first feedback gains by corresponding second feedback gains.

These feedback gains fbpDATA, fbiDATA and fbdDATA are input to the PID control unit 84 together with the speed ratio deviation RtoERR, calculated by the speed ratio deviation calculating unit 79.

A PID control unit 84 calculates a speed ratio feedback correction amount FBrto using the speed ratio deviation RtoERR and these feedback gains. For this purpose, a speed ratio feedback correction amount due to proportional control is found by multiplying the speed ratio deviation RtoERR by the gain fbpDATA, a speed ratio feedback correction amount due to integral control is found by multiplying the speed ratio deviation RtoERR by the gain fbiDATA, and a speed ratio feedback correction amount due to proportional control is found by multiplying the speed ratio deviation RtoERR by the gain fbdDATA. These are then substituted into the following PID control equation known in the art to calculate the speed ratio feedback correction amount FBrto.

$$FBrto = RtoERR \cdot fbpDATA + \left(\int RtoERR\right) \cdot fbiDATA + \left(\frac{d}{dt} RtoERR\right) \cdot fbdDATA$$

The adder 85 adds the torque shift error correction value TSrto and the speed ratio feedback correction amount FBrto to the transient target speed ratio RatioO to calculate a compensated transient target speed ratio DsrRTO.

A target step number calculating unit 86 calculates a target number of steps DsrSTP of the step motor 4 corresponding to the compensated transient target speed ratio DsrRTO by looking up a map stored beforehand in the controller 61.

On the other hand, a step motor drive rate determining unit 88 determines a physical operating limit rate of the step motor 4 based on the oil temperature TMP of the transmission.

A step motor drive position command computing unit 87 determines whether or not the step motor 4 can attain a target numbers of steps DsrSTP in the aforesaid speed ratio control cycle based on this physical operating limit rate. A value obtained by correcting the target step number DsrSTP based on the physical operating limit rate is set as the command signal Astep.

The command signal Astep is therefore considered to correspond to the actual rotation position of the step motor 4.

The control by this control device in the automatic operation mode is different form that in the manual operation mode.

Figure 5:
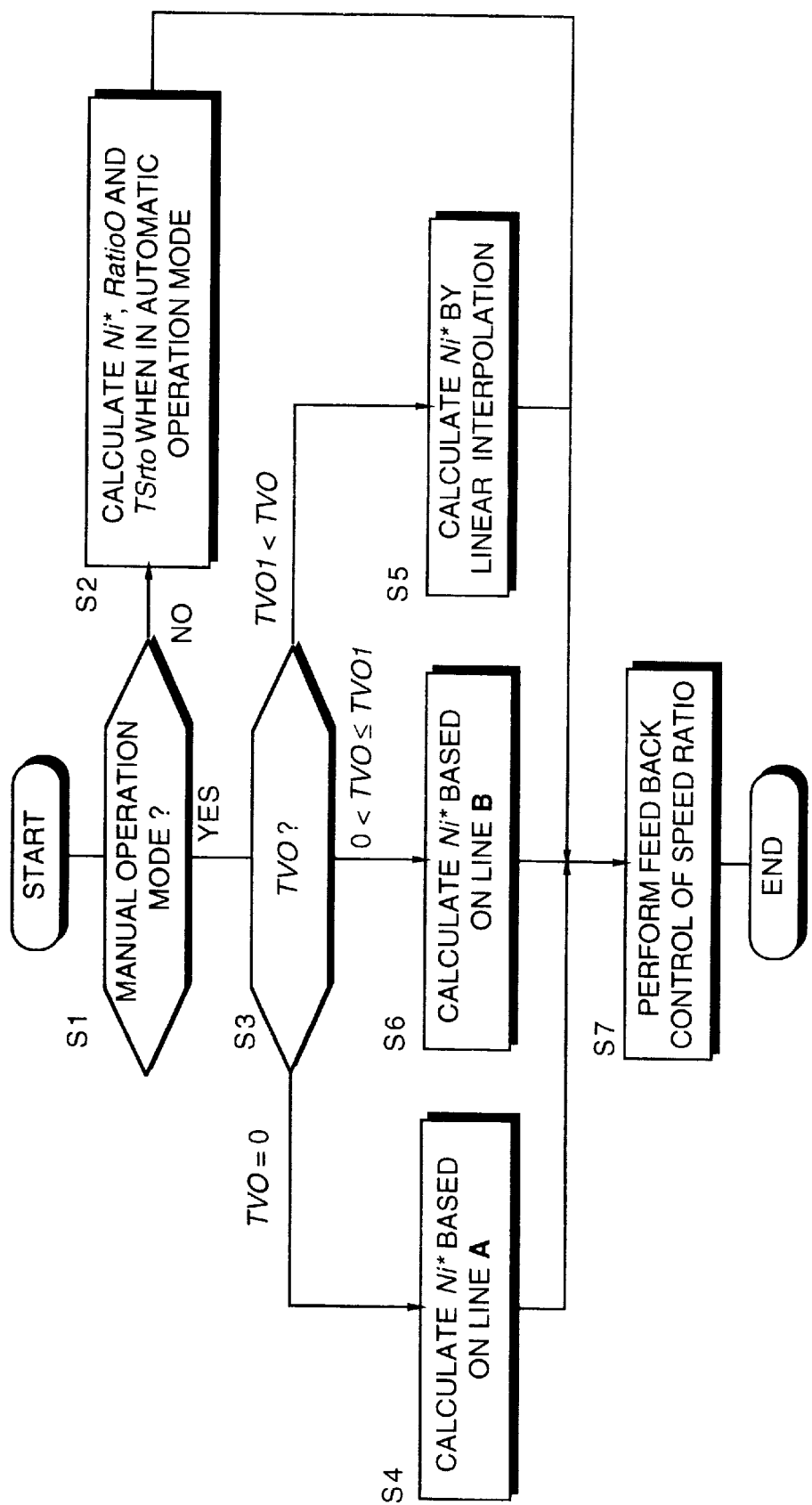
FIG. 5 is a flowchart describing a speed ratio control routine performed by the controller.

This difference will now be described referring to FIG. 5. FIG. 5 shows a speed change control routine by the controller 61. This routine is executed at a regular interval, e.g., 10 milliseconds.

First, in a step S1, it is determined whether or not the operation mode which was selected by the driver via the selector lever 59 is the manual operation mode. The determination is made based on the input signal from the range sensor 69.

When the selected mode is the manual operation mode, the routine performs a process of step S3. When the selected mode is not the manual operation mode, the routine proceeds to a step S2.

In the step S2, the controller 61 further determine the specified range. When the specified range is the forward travel automatic operation range, it performs a calculation of the final input rotation speed Ni* of the transmission by looking up the aforesaid speed change map of FIG. 4. The transient target speed ratio RatioO and torque shift error correction value TSrto are also calculated as described with reference to the block diagram of FIG. 3. After these calculations, the routine proceeds to a step S7.

In the step S7 the feedback control of the speed ratio is performed based on the transient target speed ratio RatioO and torque shift error correction value TSrto as also described with reference to the block diagram of FIG. 3. After the processing of the step S7, the routine is terminated.

In the step S2, the specified range may also be the reverse range, neutral range, or parking range. However, since this invention is related to the speed ratio control when the vehicle is traveling forward and has nothing to do with these ranges, the explanation of the operation in these ranges are omitted.

Figure 6:
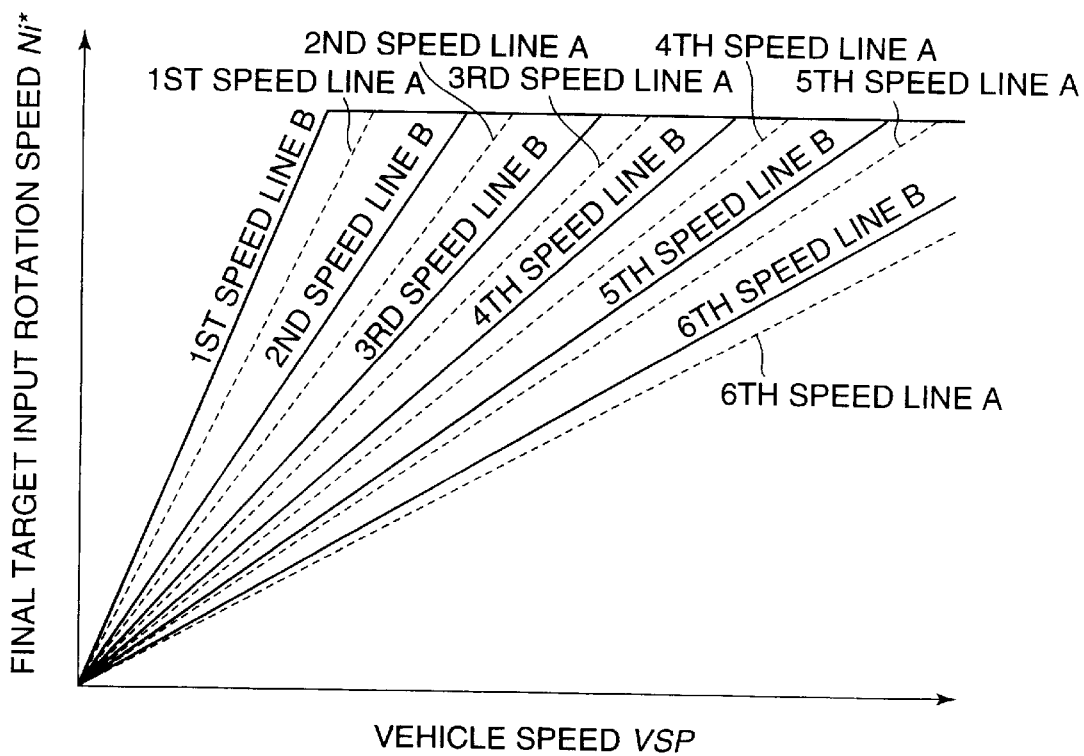
FIG. 6 is a diagram describing the contents of a speed change map in a manual operation mode stored by the controller.

On the other hand, when the manual operation mode was selected in the step S1, the final target input rotation speed Ni* is calculated by looking up a map for the manual operation mode which is shown in FIG. 6.

This map is a speed change map which defines six speed ratio grades simulating a six-speed manual transmission. In the map, each speed ratio grade is provided with two speed ratio lines, a line A for the decreasing input torque and a line B for increasing input torque. The difference between line A and B is larger the lower the speed ratio grade. Herein, the lower speed ratio grade corresponds to the lower gear in the manual transmission.

In order to perform the calculation of the final target input rotation speed Ni*, the routine first compare the throttle opening TVO with 0 and a predetermined opening TVO1 in the step S3. Herein, the throttle opening TVO is considered to represent the input torque of the transmission.

When the throttle opening TVO is 0, the routine proceeds to a step S4. In the step S4, the final target input rotation speed Ni* is calculated from the vehicle speed VSP by referring to the line A of the designated speed ratio grade in the speed change map of FIG. 6.

When the throttle opening TVO is larger than the predetermined opening TVO1 in the step S3, the routine proceeds to a step S5. The predetermined opening TVO1 is set equal to ⅛ for example.

In the step 5, the final target input rotation speed Ni* is calculated from the vehicle speed VSP by referring to the line B of the designated speed ratio grade in the speed change map of FIG. 6.

When throttle opening TVO is larger than 0 but smaller than the predetermined opening TVO1 in the step S3, the routine proceeds to a step S6.

Herein, the final target input rotation speed Ni* is obtained from the vehicle speed VSP by performing an interpolate calculation with respect to the values obtained from the lines A and B of the designated speed ratio grade in the speed change map of FIG. 6.

Figure 7:
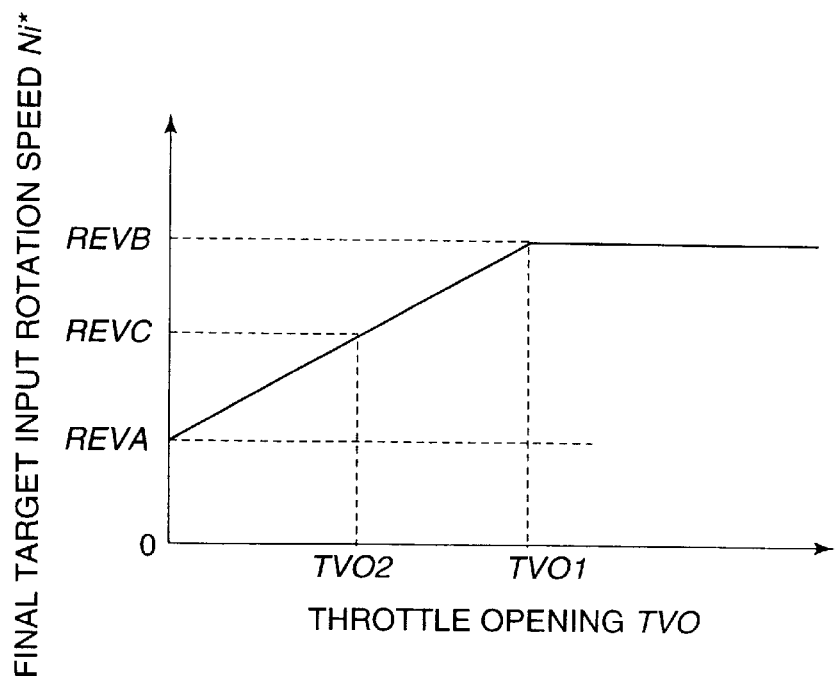
FIG. 7 is a diagram explaining a calculation by linear interpolation of a final target input rotation speed Ni* performed by the controller in the manual operation mode.

This interpolate calculation will now be described referring to FIG. 7.

In this figure, the current throttle opening is represented by TVO2,. A value REVA of the final target input rotation speed Ni* when TVO=0 is obtained by referring to the line A for the designated speed ratio grade.

The value REVB of the final target input rotation speed Ni* when TVO>TVO01 is obtained by referring to the line B for the designated speed ratio grade.

The value REVC of the final target input rotation speed Ni* for the throttle opening TVO2 is then calculated by the following relation.

$$REVC = REVA + (REVB - REVA) \cdot \frac{TVO2}{TVO1}$$

The value REVC is set to the final target input rotation speed Ni*.

The processing of the steps S4, S5 and S6 corresponds to the functions of the speed change map selecting unit 71, final input rotation speed calculation unit 72, final target speed ratio computing unit 73, input torque calculating unit 76 and torque shift error correction unit 77.

As described earlier, the torque shift error is significant when the throttle opening TVO varies form 0 to ⅛, or vice versa. In this speed ratio control device, each speed ratio grade is provided with two speed lines A and B so as to be selectively applied according to the throttle opening TVO in the calculation of the final target input rotation speed Ni*, and the interpolate calculation is employed in the calculation when the throttle opening TVO is between 0 and ⅛. By this processing, the final target input rotation speed Ni*, is equivalent to the actual speed ratio under the effect of the torque shirt error.

Figure 8A:
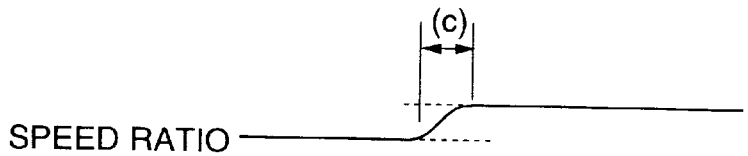
FIGS. 8A–8C are timing charts describing the variation of the speed ratio, an engine output torque and a throttle opening under the speed ratio control by the control device according to this invention.
Figure 8B:
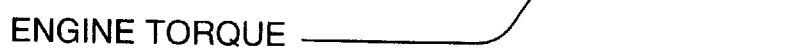
Figure 8C:
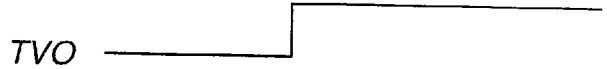

In other words, when the throttle opening TVO varies, the final target speed ratio is automatically modified so as to be equal to the actual speed ratio of the transmission under the effect of the torque shirt error. The speed ratio of the transmission increases due to the torque shift error when the throttle opening TVO increases as shown in section (c) of FIGS. 8A–8C, but even after the variation of TVO, the increased speed ratio is maintained, because the final target speed ratio was also increased in response to the increase of the throttle opening TVO. The oscillation of the speed ratio due to feedback correction of the torque shift error is thereby prevented.

Further, as also described earlier, the torque shift error is larger the larger the speed ratio. According to this speed control device, the difference of the lines A and B is set to be larger the lower the speed grade, i.e., the larger the speed ratio. Therefore the final target speed ratio well coincide with the actual speed ratio under the effect of the torque shift error.

On the contrary, according to the aforesaid prior art, when the throttle opening TVO is changed, the feedback correction of the speed ratio is performed so as to recover the speed ratio before the torque shift error is introduced, This prior art speed ratio control causes the oscillation of the speed ratio as shown in sections (a) and (b) of FIGS. 9A–9C.

The contents of Tokugan Hei 10-211042 with a filing date of Jul. 27, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, instead of performing the interpolate calculation when the throttle opening is between 0 and TVO1, further speed ratio lines may be set wherein one of which is selectively applied according to the value of the throttle opening. The object of this invention may also be achieved by detecting the torque shift error and prevent the speed ratio from varying when the torque shift error is detected.

Further, the input torque of the toroidal continuously variable transmission is represented by the throttle opening TVO of the engine in the above embodiment, but it is also possible to directly detect the input torque by using a torque senor.

The embodiments of this invention in which an exclusive property or privilege is claimed are defined as follows:

What is claimed is:

1. A speed ratio in combination controller with a toroidal continuously variable transmission for a vehicle, said transmission transmitting an input torque from an engine to a drive wheel at an arbitrary speed ratio, said controller comprising:

a member for selecting either of an automatic operation mode and a manual operation mode of said transmission, a member for designating a speed ratio grade in the manual operation mode, a sensor for detecting the input torque of said transmission, a sensor for detecting a real speed ratio of said transmission, and a microprocessor programmed to:

calculate a target speed ratio according to the speed ratio grade designated by said speed ratio grade designating member, feedback control the speed ratio of said transmission such that said real speed ratio coincides with said target speed ratio. and prevent the speed ratio of said transmission from varying irrespective of said target speed ratio, after said input torque is varied.

2. A speed ratio controller as defined in claim 1, wherein said engine is provided with a throttle which varies an output torque of the engine according to a throttle opening of said throttle, and said input torque detecting sensor comprises a throttle sensor for detecting the throttle opening of said throttle.

3. A speed ratio controller as defined in claim 1, wherein said microprocessor is further programmed to prevent the speed ratio of said transmission from varying after said input torque is varied by feedback controlling the speed ratio of said transmission, when said input torque is increasing, to a second target speed ratio which is larger than said target speed ratio, while feedback controlling the speed ratio of said transmission, when said input torque is decreasing, to a second target speed ratio which is smaller than said target speed ratio.

4. A speed ratio controller as defined in claim 1, wherein said microprocessor is further programmed to store a first target speed ratio for each speed grade for a case where said input torque is equal to or less than a predetermined minimum torque, store a second target speed ratio for each speed range for a case where said input torque is larger than a predetermined threshold torque, said predetermined threshold torque being larger than said predetermined minimum torque, calculate a third target speed ratio from said first and second target speed ratios by linear interpolation, when said input torque is larger than said predetermined minimum torque and smaller than or equal to said predetermined threshold torque, and prevent the speed ratio of said transmission from varying after said input torque is varied by feedback correcting the speed ratio of said transmission to said third target speed ratio.

5. A speed ratio controller as defined in claim 4, wherein said engine is provided with a throttle which varies an output torque of the engine according to a throttle opening of said throttle, said input torque detecting sensor comprises a throttle sensor for detecting the throttle opening of said throttle, said predetermined minimum torque is set equal to a value when the throttle opening is 0 and said predetermined threshold torque is set equal to a value when the throttle opening is ⅛.

6. A speed ratio controller as defined in claim 4, wherein said microprocessor is further programmed to set said second target speed ratio when said input torque is larger than said predetermined threshold torque equal to said second target speed ratio when said input torque is equal to said predetermined threshold torque.

7. A speed ratio controller as defined in claim 6, wherein said controller further comprises a sensor for detecting a running condition of said vehicle, and said microprocessor is further programmed to determine the target speed ratio of said transmission based on the running condition, calculate a torque shift error of speed ratio from a variation of said input torque, correct said target speed ratio based on said torque shift error, and feedback control the speed ratio of said transmission to a corrected target speed ratio, when said automatic operation mode is selected.

8. A speed ratio controller as defined in claim 7, wherein said microprocessor is further programmed not to correct said target speed ratio based on said torque shift error, when said manual operation mode is selected.

9. A speed ratio controller as defined in claim 6, wherein a difference between said first target speed ratio and said second target speed ratio is preset so as to compensate a speed ratio variation according to a variation of said input torque.

10. A speed ratio controller as defined in claim 9, wherein the difference between said first target speed ratio and said second target speed ratio is preset to be larger the lower the speed ratio grade.

11. A speed ratio controller for use with a toroidal continuously variable transmission for a vehicle, to transmit an input torque from an engine to a drive wheel at an arbitrary speed ratio, said controller comprising:

means for selecting either of an automatic operation mode and a manual operation mode of the transmission, means for designating a speed ratio grade in the manual operation mode, means for detecting the input torque of the transmission, means for detecting a real speed ratio of the transmission, means for calculating a target speed ratio according to the speed ratio grade designated by said speed ratio grade designating means, means for feedback controlling the speed ratio of the transmission such that said real speed ratio coincides with said target speed ratio, and means for preventing the speed ratio of the transmission from varying irrespective of said target speed ratio, after said input torque is varied.

12. A speed ratio controller for use with a toroidal continuously variable transmission for a vehicle, said transmission transmitting an input torque from an engine to a drive wheel at an arbitrary speed ratio, said controller comprising:

a member for selecting either of an automatic operation mode and a manual operation mode of said transmission, a member for designating a speed ratio grade in the manual operation mode, a sensor for detecting the input torque of said transmission, a sensor for detecting a real speed ratio of said transmission, and a microprocessor programmed to:

calculate a target speed ratio according to the speed ratio grade designated by said speed ratio grade designating member, feedback control the speed ratio of said transmission such that said real speed ratio coincides with said target speed ratio, and prevent the speed ratio of said transmission from varying irrespective of said target speed ratio, after said input torque is varied.

13. A method for controlling a speed ratio of a toroidal continuously variable transmission for a vehicle, said transmission transmitting an input torque from an engine to a drive wheel at an arbitrary speed ratio, said transmission comprising a member for selecting either of an automatic operation mode and a manual operation mode of said transmission, and a member for designating a speed ratio grade in the manual operation mode, said method comprising:

detecting the input torque of said transmission, detecting a real speed ratio of said transmission, calculating a target speed ratio according to the speed ratio grade designated by said speed ratio grade designating member, feedback controlling the speed ratio of said transmission such that said real speed ratio coincides with said target speed ratio, and preventing the speed ratio of said transmission from varying irrespective of said target speed ratio, after said input torque is varied.

* * * * *